Oct. 18, 1938.  E. O. SCHJOLIN  2,133,578
INDUCTION SYSTEM
Filed Aug. 22, 1936  3 Sheets-Sheet 1
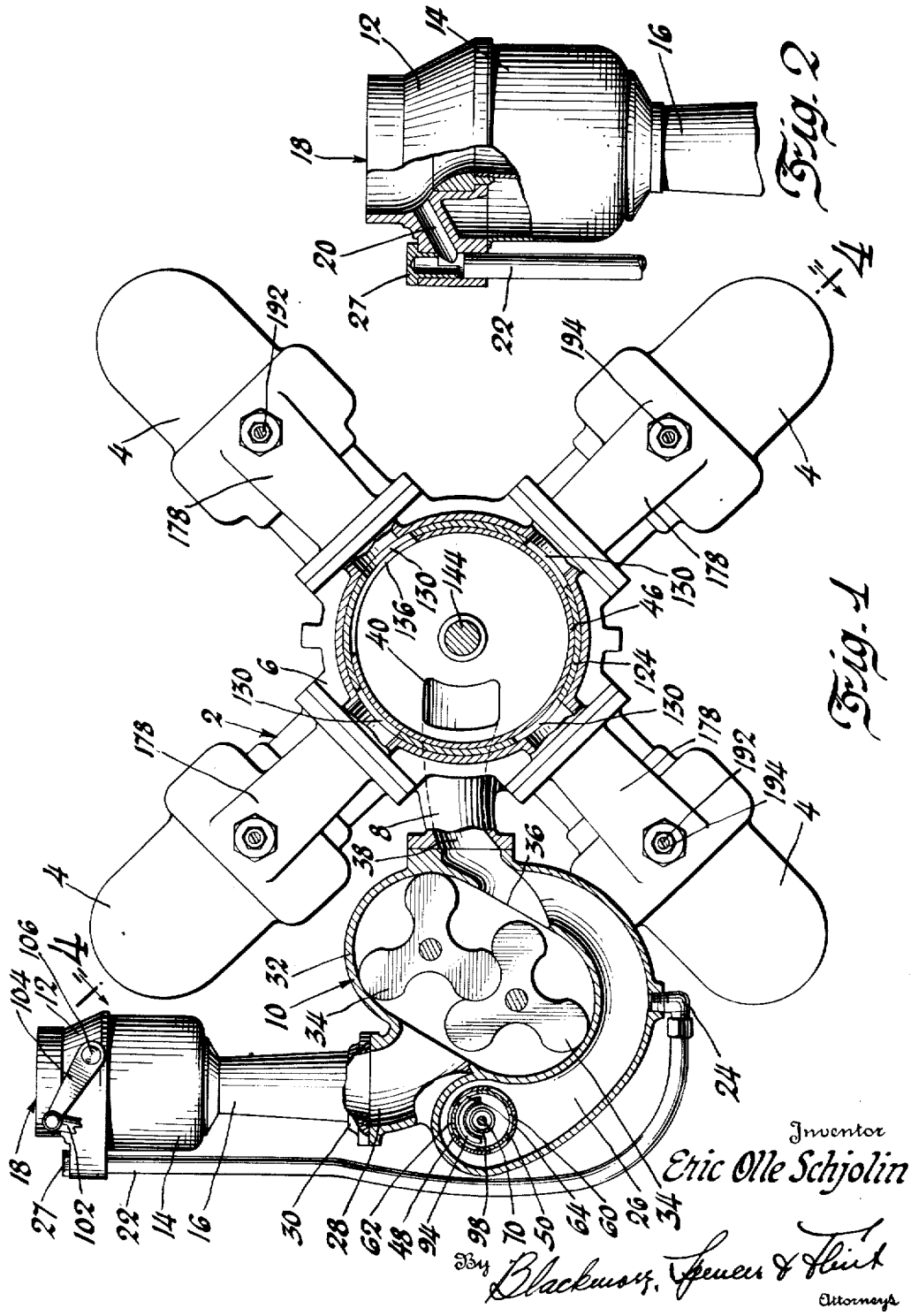

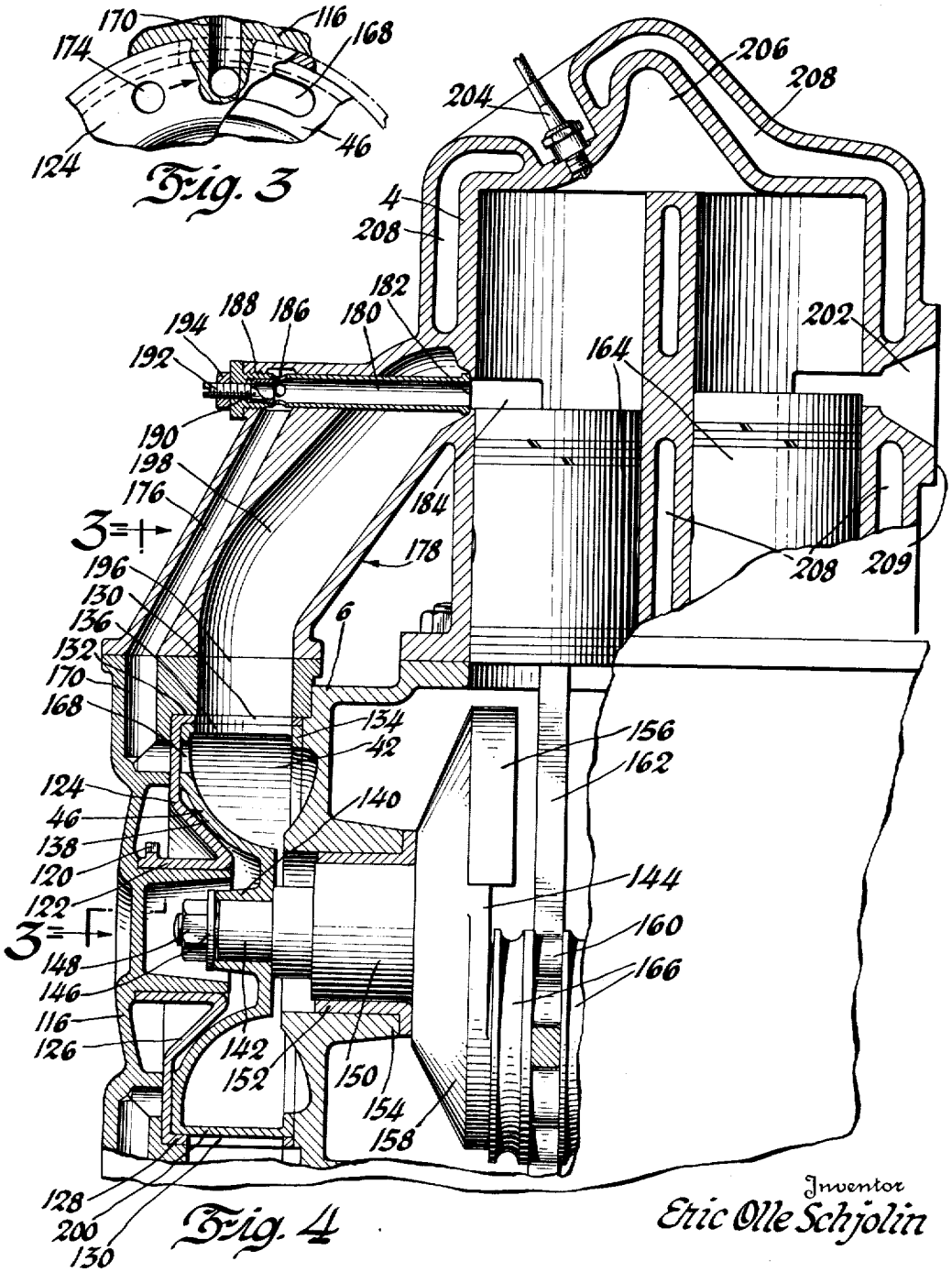

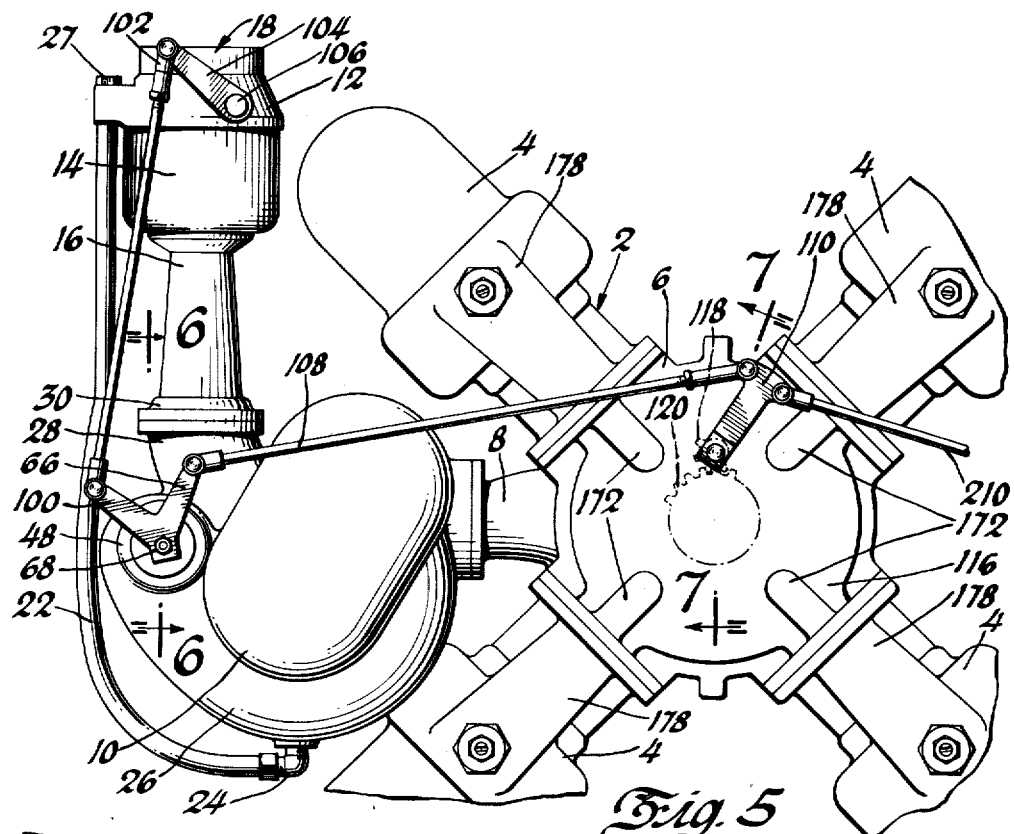
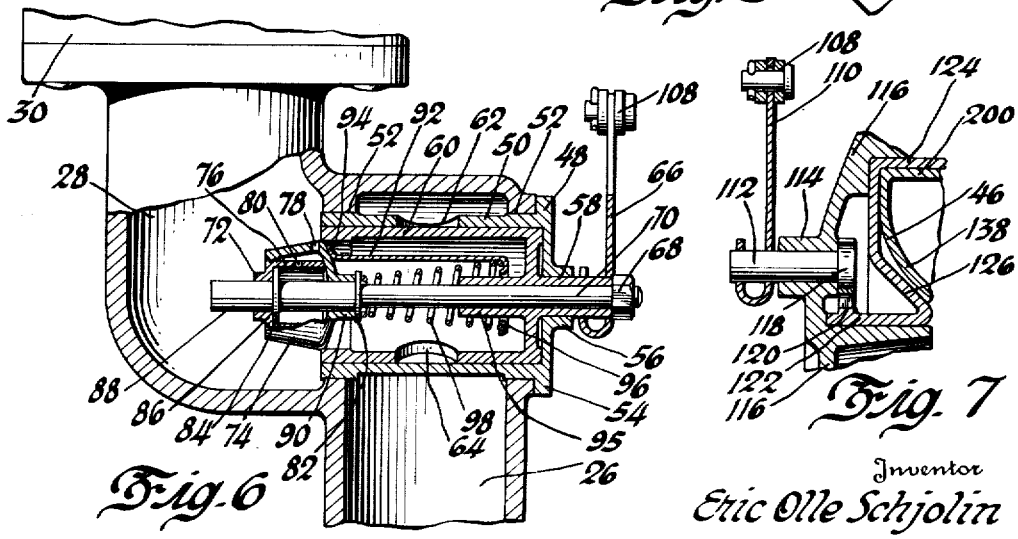

Patented Oct. 18, 1938

2,133,578

UNITED STATES PATENT OFFICE 2,133,578

INDUCTION SYSTEM

Eric Olle Schjolin, Pontiac, Mich., assignor to General Motors Corporation, Detroit, Mich., a corporation of Delaware Application August 22, 1936, Serial No. 97,346

14 Claims. (Cl. 123—55)

This invention relates to internal combustion engines and has particular reference to an induction system for a two-cycle four cylinder radial engine.

One novel feature of the invention resides in the use of a rotary valve operating in a housing which takes the place of the usual manifold. The engine drives a blower which draws the carbureted mixture from the carburetor. A valve controlled by-pass is provided to by-pass the mixture around the blower when the passages to the cylinders are closed and an auxiliary conduit is also provided to return any unvolatilized fuel to the carburetor. Separate passages are provided from the rotary valve to the cylinders to allow idling of the engine.

A further novel feature of the invention relates to the simultaneous operation of the rotary valve, the valve in the by-pass around the blower and the gasoline feed to the carburetor. The three are interconnected with the accelerator pedal so that they operate simultaneously and in timed relation with each other.

On the drawings:

Figure 1 is an end view of the engine, with parts shown in section better to illustrate the construction.

Figure 2 is an enlarged view of the carburetor showing the return conduit to return unvolatilized fuel.

Figure 3 is a sectional detailed view on the line 3—3 of Figure 4.

Figure 4 is a sectional detailed view through one of the cylinders, the idling conduit, the rotary valve and rotor on the line 4—4 of Figure 1.

Figure 5 is an end view similar to Figure 1 but showing the operating means for the rotary valve, the by-pass conduit and the carburetor.

Figure 6 is a sectional detailed view of the valve in the by-pass around the carburetor taken on the line 6—6 of Figure 5.

Figure 7 is a sectional detailed view on the line 7—7 of Figure 5.

Referring to the drawings, the numeral 2 indicates a two-cycle internal combustion engine as a whole. The engine has the four cylinders 4 separately cast and bolted or otherwise secured to the crankcase 6. The crankcase is provided with an integral hollow extension 8 to which there is attached the blower 10. The blower has attached thereto the carburetor 12, the float bowl of which is indicated at 14 and the descender at 16.

The air inlet to the carburetor is indicated at 18. To the air inlet there leads a passage 20 connected to a conduit or tube 22 which is connected to a fitting 24 secured to the bottom of a by-pass conduit or passage 26. The conduit 22 has for its object to return any unvolatilized fuel which passes through the blower and falls into the by-pass conduit 26. The pressure of the blower 10 and the suction of the air at the mouth 18 of the carburetor will pull the unvolatilized fuel through the fitting 24 to the passage 22 in the carburetor. An adjustable plug 27 in the passage 20 at the carburetor controls the extent of opening of the passage 22.

The descender 16 is connected to the entrance 28 of the blower by means of the fitting 30. In the housing 32 of the blower there are the two three vane rotors 34 driven from the engine 2 as is best described in my co-pending application S. N. 97,345 filed August 22, 1936. The blower takes the carbureted air at the inlet 28 and delivers it to the outlet 36. From the exit 36 the carbureted mixture is delivered into the passage 38 through the engine block and to the outlet 40 from where it is delivered into a chamber 42 (Figure 4) formed inside a rotor or rotary valve 46. When the passage of carbureted mixture is not impeded, the blower will deliver the greater portion of the carbureted mixture into the passage 38. However, should the passage to the cylinders 4 be obstructed, the blower will deliver the carbureted fuel into the passage 26. The passage 26 has a by-pass valve indicated as a whole at 48 and shown in detail in Figure 6. The by-pass valve comprises the stationary cage or housing 50 mounted in suitable openings 52 in the conduit 26. The cage has the exterior flange 54 which abuts against the outside of the conduit 26 and is also provided with a central hub 56 provided with a bore in which there is rotatably mounted the extension 58 of the inner rotatable valve 60. The valve 60 is adapted closely to fit inside the outer cage 50. The cage 50 has a plurality of openings 62 while the valve has a similar series of openings 64. The openings are so positioned that they will align with each other in certain positions of the valve and in other positions they will be unaligned. The valve 60 is operated by a lever 66 secured to the extension 58 by means of the nut 68 which is threaded on the end of the shaft 70 passing through the extension 58. On the other end of the shaft 70 there is slidably mounted the valve 72. The valve 72 comprises the outer head 74 and the inner cylinder 76. The head 74 has an opening 78 and the cylinder 76 has an opening 80. The shaft 70 has rigidly mounted thereon, the disks 86

82 and 84 against which the ends of the valve 72 seat when it is in closed position, or the position shown in Figure 6. The inner cylinder 76 has the hub 86 which closely fits on the enlarged end 88 of the shaft 70, while the inner end of the cage 74 has a hub 90 which fits on the inner end of the enlarged portion 88. A frame 92 is secured to the head 74 by means of a flange 94 and has its other end inwardly flanged and encircles the projection 95 and is formed into a spring seat 96. A conical shaped coil spring 98 is positioned between the disk 82 and the seat 96 and constantly urges the valve 72 to a closed position or the position shown in Figure 6. When the passage of carbureted fuel is impeded through the passage 38, the blower will force the mixture into the conduit 26. The valve 50, operating in timed relation with the rest of the mechanism, will be moved so that the openings 62 and 64 will mate with each other to enable the carbureted mixture to enter the interior of the rotary valve 60. The pressure of the blower will cause the valve 72 to unseat and slide on the enlarged end 88 of the shaft and compress the spring 98. This movement will cause the air trapped between the disk 84 and the cylinder 76 to be forced through the openings 80 and 78. When the gaseous mixture is again able to pass through the passage 38, the position of the ports 62 and 64 will be returned to the position shown in Figure 6. This will allow the spring 98 to return the valve to the position shown in Figure 6. When the valve is being returned there will be a flow of air through the passages 78 and 80 into the cylinder 76. The purpose of the openings 78 and 80 and the flow of the small quantity of air into and out of the cylinder 76 is to prevent chattering or unnecessary vibration of the valve and to assure a smooth movement. In other words the structure acts as a dashpot.

Referring to Figure 5, it will be noted that the lever 66 has an arm 100 which is connected by means of a link 102 to a lever 104 secured to a shaft 106 at the top of the carburetor. The lever 106 controls a mechanism inside the carburetor to control the admission of liquid fuel thereto at certain engine speeds. The details of the fuel admission is a structure relating to the carburetor per se and is not shown.

A link 108 is pivotally connected to the lever 66 and is pivoted at its other end to an arm 110. The arm 110 is secured to a shaft 112 journaled in a hub 114 formed in a cage or housing 116 secured to the end of the crankcase 6. Inside the housing 116 a toothed sector 118 is secured to the end of the shaft 112. The teeth of the sector mesh with teeth 120 formed on a hub 122 of a rotary valve 124. The hub 122 is secured to the main flange of the valve by means of the inclined part 126. The outer part of the valve is formed by a cylindrical flange 128 provided with four ports 130 spaced 90° apart. The number of ports in the valve will correspond to the number of cylinders on the engine, and where an engine of more than four cylinders is used, the number of holes will correspond to the number of cylinders. The housing 116 is machined to form a seat 132 for the valve and the valve surface and the flange 128 are likewise machined to give an accurate and close fit. The rotor 46 is likewise machined and closely fits the inside of the valve 128 as is best shown in Figure 4. The rotor has the outer cylindrical flange 134 provided with the single opening 136 which is adapted to mate once each revolution with each one of the openings 130 in the valve 124. The rotor 46 has the arched inturned part 138 conforming to the part 126 in the valve 124. The inturned part 128 terminates in the hub 140 mounted on the reduced stub end 142 of the crankshaft 144. The rotor is held in place by means of a washer 146 and the nut 148.

The crankshaft has the bearing part 150 which rotates in a bearing shell 152 mounted in a bearing seat 154 in the crankcase 6. The crankshaft has the balancing weight 156 and the crank arms 158 to which there are attached the bearing seats 160 of the connecting rods 162, pivoted to the usual pistons 164 operating in the U type cylinders 4 as shown in Figure 4. The bearing parts 160 are secured to the throws of the crankshaft by means of the bearing retainer rings 166.

As shown in Figure 3, the side of the rotor 46 has a small elongated opening 168 which is radially positioned so that it may mate or conform to passages 170 formed in protuberances 172 (see Figure 5) formed on the housing 116. The rotary valve 124 has four small openings 174, 90° apart and which are radially spaced the same distance as the elongated opening 168 on the rotor 46. For certain positions of the valve, the openings 174 conform or mate with the ends of the passages 170 and when the opening 168 in the rotor conforms to the passage 170 the gaseous fuel from the chamber 42 inside the rotor may pass through the passage 170 into the conduit or passage 176, formed in integral extensions 178 cast with the cylinders 4. The passage 176 is formed in two parts, one connecting with the passage 170 and the second part 178 being directed toward the interior of the cylinders 4. In the passage 178 there is placed the tube 180, the end 182 of which delivers directly to the inlet port 184 of the cylinders 4. The outer end of the tube is provided with four openings 186 through which carbureted fuel may enter from the passage 176 and be delivered on the mouth 182 and into the cylinders 4 to enable the engine properly to idle. The end of the tube 180 is screwthreaded as at 188 and screwed into the end of the passage 178, and inside the tube there is placed the valve or control member 190 displaceable by means of the screw 192 to open or close to a greater or less extent, the openings 186 and thereby to control the amount of fuel used for idling. The screw 192 is held in place by means of the lock nut 194.

Referring to the rotor or rotary valve 46 and the valve 124 and particularly the position of the parts shown in Figure 4, it will be seen that when the ports or openings 130 and 136 mate with the passage 196 in the housing, the gaseous fuel from the chamber 42 will pass from the passage 196 into the inlet passage 198 to be delivered to the intake port 184. The tube 180 traverses the top of the passage 198. The intake passage 198 is formed in the projections 178 cast with the cylinders 4. At the bottom of Figure 4, it will be noted that the solid portion 200 of the rotor flange 134 closes the opening or port 130 to the diametrically opposite cylinder 4. The flange 200 will also close the ports 130 to the remaining two cylinders. Only one cylinder will therefore receive fuel at a time. As the opening 136 in the rotor or rotary valve 46 passes the upper opening 130 in Figure 4, the solid part 200 of the rotor flange will close the opening 130. The continued movement of the rotor or rotary valve will cause its opening 136 to mate with the next opening 130 in the rotary valve, to deliver fuel to the next adjacent cylinder. This cycle will continue and for each revolution of the rotor 46 a charge of fuel will be delivered to each cylinder 4.

The exhaust ports are indicated at 202 and the spark plugs at 204. The combustion chambers are indicated at 206, while the passages for the water circulating system of the engine are indicated at 208. The exhaust manifold (not shown) is attached to the face 209 at the exhaust openings.

The arm 110 has connected thereto, a link 210 (Figure 5) which corresponds to the link 22 shown and described in my co-pending application, S. N. 65,220, filed February 24, 1936. This link 210 is in turn connected to the accelerator pedal as described in application, S. N. 65,220. Accordingly, the operation of the accelerator pedal will operate simultaneously the valve 124 controlling fuel admission to the cylinders, the by-pass valve 48 controlling the by-pass conduit 26, and the lever 104 controlling the fuel admission to the carburetor 12. The operation of the admission valve 124, the by-pass valve 48 and the carburetor control lever 104 is in timed relation, the one with the other. When the valve 124 is in position to allow the passage of a gaseous mixture from the chamber 42 through the ports 130 and 136 into the inlet conduit 198, the openings 62 and 64 in the by-pass valve are closed so that the fuel will be forced into the cylinders. On the other hand, the closer the valve 124 is to closing the port 130 against the passage 196, the more the openings 64 in the valve 60 conform to the openings 62 in the cage 50. When the admission valve 124 is completely closed, the ports 62 and 64 are in alignment to allow the blower to force the carbureted fuel through the by-pass passage 26, through the valve 72, and to the blower entrance 28. At higher speeds the lever 104 operating the shaft 106 will control the fuel admission to the carburetor to cause additional fuel to pass through the inlet jet to be entrained by the air entering the mouth 18 of the carburetor. If during the operation of the engine, any liquid fuel should be deposited on the walls of the various passages, it will flow to the lowest point or to the fitting 24 to be taken up and passed through the conduit 22 into the carburetor inlet. This liquid fuel is forced into the carburetor inlet by the blower pressure at the fitting 24 and by the suction at the inlet 18 of the carburetor. When the valve 124 is rotated to move its openings 130 away from the passage 196, the smaller openings or ports 174 are then moved to align with the passages 170 to enable enough carbureted fuel to pass through the ports 168 and 174 into the passages 170 and 176 to allow efficient idling of the engine.

I claim:

1. In an induction system for a two-cycle internal combustion engine having a plurality of cylinders with intake passages leading thereto, a carburetor, a blower between the carburetor and the engine, a chamber into which the blower delivers the carbureted mixture, a rotary valve in said chamber, a second valve in said chamber to control the intake passages, said rotary valve having a single port and said valve having a plurality of ports corresponding in number to the number of cylinders, said rotary valve port adapted successively to mate with each of the ports in the valve once for each revolution of the crankshaft, the mating of the rotary valve port with a port of the second valve causing the blower to deliver the carbureted mixture to the cylinder corresponding to the port of the second valve.

2. In an induction system for a two-cycle internal combustion engine having a plurality of cylinders with intake passages leading thereto, a carburetor, a blower between the carburetor and the engine, a chamber into which the blower delivers the carbureted mixture, a rotary valve in said chamber, a second valve in said chamber to control the intake passages, said rotary valve having a single port and said second valve having a plurality of ports corresponding in number to the number of cylinders, said rotary valve port adapted successively to mate with each of the ports in the second valve once for each revolution of the crankshaft, the mating of the rotary valve port with a port of the second valve causing the blower to deliver the carbureted mixture to the cylinder corresponding to the port of the second valve, and a bypass conduit around the blower operative when the second valve is in closed position.

3. In an induction system for a two-cycle internal combustion engine having a plurality of cylinders, a carburetor, a blower between the carburetor and the engine, a chamber into which the blower delivers the carbureted mixture, a rotary valve in said chamber, a second valve in said chamber, said rotary valve having a single port and said second valve having a plurality of ports corresponding in number to the number of cylinders, said rotary valve port adapted successively to mate with each of the ports in the second valve once for each revolution of the crankshaft, the mating of the rotary valve port with a port of the second valve causing the blower to deliver the carbureted mixture to the cylinder corresponding to the port of the second valve, and separate idler conduits from the chamber to the cylinders operative when the second valve is in closed position.

4. In an induction system for a two-cycle internal combustion engine having a plurality of cylinders, a carburetor, a blower between the carburetor and the engine, a chamber into which the blower delivers the carbureted mixture, a rotary valve in said chamber, a second valve in said chamber, said rotary valve having a single port and said second valve having a plurality of ports corresponding in number to the number of cylinders, said rotary valve port adapted successively to mate with each of the ports in the second valve once for each revolution of the crankshaft, the mating of the rotary valve port with a port of the second valve causing the blower to deliver the carbureted mixture to the cylinder corresponding to the port of the second valve, separate idler conduits from the chamber to the cylinders operative when the second valve is in closed position, and means in the idler conduits to control the passage of carbureted mixture therethrough.

5. In an induction system for a two-cycle internal combustion engine having a plurality of cylinders, a carburetor, a blower between the carburetor and the engine, a chamber into which the blower delivers the carbureted mixture, a rotary valve in said chamber, a second valve in said chamber, said rotary valve having a single port and said second valve having a plurality of ports corresponding in number to the number of cylinders, said rotary valve port adapted successively to mate with each of the ports in the second valve once for each revolution of the crankshaft, the mating of the rotary valve port with a port of the second valve causing the blower to deliver the carbureted mixture to the cylinder corresponding to the port of the second valve, a by-pass conduit around the blower operative when the second valve is in closed position, and a conduit from the blower by-pass to the carburetor to cause the return to the carburetor of unvolatilized fuel.

6. In an induction system for a two-cycle internal combustion engine having a plurality of cylinders, a carburetor, a blower between the carburetor and the engine, a chamber into which the blower delivers the carbureted mixture, a rotary valve in said chamber, a second valve in said chamber, said rotary valve having a single port and said second valve having a plurality of ports corresponding in number to the number of cylinders, said rotary valve port adapted successively to mate with each of the ports in the second valve once for each revolution of the crankshaft, the mating of the rotary valve port with a port of the second valve causing the blower to deliver the carbureted mixture to the cylinder corresponding to the port of the second valve, a by-pass conduit around the blower operative when the second valve is in closed position, and means in the by-pass conduit to control the flow of carbureted mixture therethrough.

7. In an induction system for a two-cycle internal combustion engine having a plurality of cylinders, a carburetor, a blower between the carburetor and the engine, a chamber into which the blower delivers the carbureted mixture, a rotary valve in said chamber, a second valve in said chamber, said rotary valve having a single port and said second valve having a plurality of ports corresponding in number to the number of cylinders, said rotary valve port adapted successively to mate with each of the ports in the second valve once for each revolution of the crankshaft, the mating of the rotary valve port with a port of the second valve causing the blower to deliver the carbureted mixture to the cylinder corresponding to the port of the second valve, a by-pass conduit around the blower operative when the second valve is in closed position, means to control the second valve, the carburetor and the by-pass, and single means to operate the three control means in timed relation with each other.

8. In an induction system for a two-cycle engine having a crankshaft and a plurality of cylinders, a chamber in the engine block, a rotary valve on the crankshaft operating in the chamber, said rotary valve having a port, passages from the chamber, one passage leading to each cylinder, a circular valve around the rotor, a plurality of ports in said circular valve, said ports being equal in number to the number of cylinders, said rotary valve port being adapted to mate successively with all of the ports in the circular valve to deliver carbureted fuel to the cylinders, and means to control the position of the circular valve.

9. In an induction system for a two-cycle engine having a plurality of cylinders, a chamber in the engine block, a rotary valve on the crankshaft operating in the chamber, said rotary valve having a port, passages from the chamber, one passage leading to each cylinder, a circular valve around the rotary valve, a plurality of ports in said circular valve, said ports being equal in number to the number of cylinders, said rotary valve port being adapted to mate successively with all of the ports in the circular valve to deliver carbureted fuel to the cylinders, a plurality of smaller ports in the circular valve, a single smaller port in the rotary valve adapted to mate with the smaller circular valve ports to enable the engine to idle when the circular valve is moved to close the passages to the engine cylinders.

10. In an induction system for a two-cycle internal combustion engine having a plurality of cylinders, a housing at one end of the engine, a rotary valve in said housing and driven by the crankshaft, a single port in said valve, a circular valve surrounding the rotary valve, means to control the position of said circular valve, a plurality of ports in said valve corresponding in number to the number of cylinders, conduits from the housing to the cylinders, said ports in the two valves adapted to mate in timed relation with the inlet to the passage to cause carbureted fuel to be delivered to the cylinders, and means in the engine block to deliver the carbureted mixture into the rotary valve.

11. In an induction system for a two-cycle internal combustion engine having a plurality of cylinders, a housing at one end of the engine, a rotary valve in said housing and driven by the crankshaft, a single large port in said rotor, a circular valve surrounding the rotary valve, means to control the position of said circular valve, a plurality of large ports in said valve corresponding in number to the number of cylinders, conduits from the housing to the cylinders one conduit for each circular valve port, said ports in the two valves adapted to mate in timed relation with the conduits to enable carbureted fuel to be delivered to the cylinders, and means in the engine block to deliver the carbureted mixture into the rotary valve, a small port in the rotary valve, a plurality of small ports in the circular valve, a plurality of small conduits leading from the housing to the cylinders, one conduit for each small circular valve opening, said small circular valve ports mating with the small conduits when the large ports are closed, said small rotary valve port mating successively with the smaller circular valve ports to cause carbureted fuel to pass into the cylinders to enable the idling of the engine.

12. In an induction system for a two-cycle internal combustion engine having a plurality of cylinders, a housing at one end of the engine, a rotary valve in said housing and driven by the crankshaft, a single large port in said rotor, a circular valve surrounding the rotary valve, means to control the position of said circular valve, a plurality of large ports in said valve corresponding in number to the number of cylinders, conduits from the housing to the cylinders, one conduit for each valve port, said ports in the two valves adapted to mate in timed relation with the conduits to enable carbureted fuel to be delivered to the cylinders, and means in the engine block to deliver the carbureted mixture into the rotary valve, a small port in the rotary valve, a plurality of small ports in the circular valve, a plurality of small conduits leading from the housing to the cylinders, one conduit for each small circular valve port, said small circular valve ports mating with the small conduits when the large ports are closed, said small rotary valve port mating successively with the small circular valve ports to cause carbureted fuel to pass into the cylinders to enable the idling of the engine, and means to regulate the idling fuel conduits.

13. In an induction system for a radial two-cycle multicylinder internal combustion engine having a crankcase and a crankshaft, a housing secured to the end of the crankcase and having the end of the crankshaft extending therein, a rotary valve secured to the crankshaft end, a peripheral port in the rotary valve, a circular valve surrounding the rotary valve, a plurality of ports in the circular valve, one valve port for each cylinder, means journally to mount the circular valve in the housing, a plurality of passages leading from the housing to the cylinders, said passages adapted to mate with the circular valve ports to enable carbureted fuel to reach the cylinders, means to move the circular valve to control the extent of opening of the ports to control the amount of fuel mixture to be delivered to the cylinders, and means to force carbureted fuel into the housing.

14. In a by-pass valve to by-pass carbureted fuel around the blower interrelated with an internal combustion engine, a by-pass conduit, a cage mounted in the conduit, ports in the cage, a rotary valve member closely fitting the cage, ports in the valve member corresponding in number to the ports in the cage, said ports adapted to mate with each other in certain positions of the valve member, means to operate the valve member, a movable head secured over the end of said valve member, and means urging the head against the end of the valve member to close the same, said head being raised from its seat by the blower pressure when the ports in the valve member conform to the ports in the cage.

ERIC OLLE SCHJOLIN.

CERTIFICATE OF CORRECTION.

Patent No. 2,133,578. October 18, 1938.

ERIC OLLE SCHJOLIN.

It is hereby certified that error appears in the printed specification of the above numbered patent requiring correction as follows: Page 4, first column, line 57, and second column, lines 27 and 53, claims 8, 11 and 12 respectively, for the word "rotor" read rotary valve; same page, second column, line 15, and lines 30 and 56 second occurrence; and page 5, first column, line 9 second occurrence, claims 10, 11, 12 and 13 respectively, before "valve" insert circular; and that the said Letters Patent should be read with this correction therein that the same may conform to the record of the case in the Patent Office.

Signed and sealed this 6th day of December, A. D. 1938.

(Seal)

Henry Van Arsdale
Acting Commissioner of Patents.

13. In an induction system for a radial two-cycle multicylinder internal combustion engine having a crankcase and a crankshaft, a housing secured to the end of the crankcase and having the end of the crankshaft extending therein, a rotary valve secured to the crankshaft end, a peripheral port in the rotary valve, a circular valve surrounding the rotary valve, a plurality of ports in the circular valve, one valve port for each cylinder, means journally to mount the circular valve in the housing, a plurality of passages leading from the housing to the cylinders, said passages adapted to mate with the circular valve ports to enable carbureted fuel to reach the cylinders, means to move the circular valve to control the extent of opening of the ports to control the amount of fuel mixture to be delivered to the cylinders, and means to force carbureted fuel into the housing.

14. In a by-pass valve to by-pass carbureted fuel around the blower interrelated with an internal combustion engine, a by-pass conduit, a cage mounted in the conduit, ports in the cage, a rotary valve member closely fitting the cage, ports in the valve member corresponding in number to the ports in the cage, said ports adapted to mate with each other in certain positions of the valve member, means to operate the valve member, a movable head secured over the end of said valve member, and means urging the head against the end of the valve member to close the same, said head being raised from its seat by the blower pressure when the ports in the valve member conform to the ports in the cage.

ERIC OLLE SCHJOLIN.

CERTIFICATE OF CORRECTION.

Patent No. 2,133,578.                                    October 18, 1938.

ERIC OLLE SCHJOLIN.

It is hereby certified that error appears in the printed specification of the above numbered patent requiring correction as follows: Page 4, first column, line 57, and second column, lines 27 and 53, claims 8, 11 and 12 respectively, for the word "rotor" read rotary valve; same page, second column, line 15, and lines 30 and 56 second occurrence; and page 5, first column, line 9 second occurrence, claims 10, 11, 12 and 13 respectively, before "valve" insert circular; and that the said Letters Patent should be read with this correction therein that the same may conform to the record of the case in the Patent Office.

Signed and sealed this 6th day of December, A. D. 1938.

(Seal)                                                Henry Van Arsdale
                                                       Acting Commissioner of Patents.